(12) United States Patent
Scea et al.

(10) Patent No.: US 9,836,586 B2
(45) Date of Patent: Dec. 5, 2017

(54) BEHAVIORAL CHARACTERISTICS BASED USER VERIFICATION

(71) Applicant: International Business Machines Corporation, Armonk, NY (US)

(72) Inventors: Kenneth A. Scea, Poughkeepsie, NY (US); Sha Sha Yang, Singapore (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 14/532,903

(22) Filed: Nov. 4, 2014

(65) Prior Publication Data

US 2016/0125176 A1    May 5, 2016

(51) Int. Cl.
G06F 21/31   (2013.01)
G06F 21/16   (2013.01)
G06F 21/32   (2013.01)

(52) U.S. Cl.
CPC ............ *G06F 21/16* (2013.01); *G06F 21/316* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 8,621,209 B1 | 12/2013 | Johansson et al. | |
| 9,195,834 B1 * | 11/2015 | Jakobsson | G06F 21/31 |
| 9,237,146 B1 * | 1/2016 | Casillas | H04L 63/08 |
| 2005/0022034 A1 * | 1/2005 | Chaudhari | G06F 21/32 |
| | | | 726/19 |
| 2008/0318563 A1 * | 12/2008 | Ross | G06F 19/322 |
| | | | 455/418 |
| 2009/0213285 A1 * | 8/2009 | Yun | G02F 1/133707 |
| | | | 349/33 |
| 2012/0198491 A1 * | 8/2012 | O'Connell | G06F 21/55 |
| | | | 725/30 |
| 2014/0189829 A1 * | 7/2014 | McLachlan | G06Q 20/4014 |
| | | | 726/6 |

OTHER PUBLICATIONS

Lee et al; In Search of Homo Economicus: Cognitive Noise and the Role of Emotion in Preference Consistency, 2009 by Journal of Consumer Research, Inc. "vol. 36" Aug. 2009, 0093-5301/2009/3602-0008$10.00. DOI: 10.1086/597160, 173-187.

* cited by examiner

*Primary Examiner* — Fatoumata Traore
(74) *Attorney, Agent, or Firm* — Garg Law Firm, PLLC; Rakesh Garg; Noah Sharkan (57) ABSTRACT

A method, system, and computer program product for user verification based on behavioral characteristics are provided in the illustrative embodiments. A set of questions is presented from an application to a user, where the user has not previously been asked the set of questions. A set of answers received from the user corresponding to the set of questions is analyzed. A score is computed using the set of answers. A determination is made whether the score matches, within a tolerance value, a base score in a psychological profile of the user. When the score matches the base score within the tolerance value, a conclusion is made that an identity of the user has been verified.

13 Claims, 6 Drawing Sheets

BEHAVIORAL CHARACTERISTICS BASED USER VERIFICATION

TECHNICAL FIELD

The present invention relates generally to a method, system, and computer program product for verifying an identity of a user. More particularly, the present invention relates to a method, system, and computer program product for behavioral characteristics based user verification.

BACKGROUND

User verification is a well-known aspect of everyday transactions. Many online as well as offline and physical transactions require a user to establish the user's identity before the transaction can be completed.

For example, in an online transaction, a user is frequently presented with data entry fields to provide a user identifier (user ID) and a password that has been previously established to identify the user. Similarly, offline transactions of transactions involving physical interaction with another human or machine also require a user to present or confirm previously established identifying information, such as a code, a number, a phrase, a keyword, an image, a pattern, a graphic, an identifier, a password, and the like (collectively hereinafter, "identifier").

Presentation of an assigned or preconfigured user ID, password, or identifier to gain access to a system or to perform a transaction is commonly referred to as primary verification. Usually, if the primary verification is successful, to wit, if the user has presented the correct assigned or preconfigured user ID, password, or identifier to a system or process, the system or process grants the user access to the system or process, or the user is otherwise allowed to complete a transaction. Some examples of additional verification methods are asking the user to recognize a picture the user has previously selected, sending a code to an address previously configured by the user and asking the user to reproduce that code from that address, and so on.

In some instances, a system or a process performs additional verification steps in addition to the primary verification process, for example, after the primary verification is successful. Additional verification adds another layer of security to the system, process, or transaction with which the user intends to interact.

Users often forget their user ID, their password, or other identifiers associated with them. User also often type, enter, input, pronounce, or otherwise provide incorrect user ID, password or other identifiers associated with them. In case of a forgotten user ID, password, or identifier, systems or procedures invoke secondary verification methods.

A secondary verification method operates in lieu of a primary or additional verification method. A secondary verification process generally operates after a failure in a primary verification process, a failure in an additional verification process, a failure in establishing the user's identity by primary or additional verification for other reasons, or some combination thereof. A secondary verification method allows the user to establish the user's identity using other information either configured by the user, or known to the user previously. Such other information is different from the user ID, password, or identifier used in the primary or additional verification processes, but comprises information that the user is expected to know because the user has configured or acknowledged that information at a previous time.

For example, if the primary verification method requires a user ID and password, and the user has forgotten or lost one or both of those pieces of information, a secondary verification process presents the user with one or more questions, commonly known as security questions. A security question and its corresponding correct answer is established by the user at a previous time, e.g., during a time when the user created or configured a user account. A secondary verification process verifies the user as the correct or valid user if for each security question the user provides the correct previously configured answer.

The security questions often ask for information that the user is expected to remember. Some examples of the security questions used for secondary verification include asking the name of a friend of the user, asking the user for an address where the user lived three years ago, asking for a statement balance from a past account statement, asking to verify certain information from the user's credit report.

SUMMARY

The illustrative embodiments provide a method, system, and computer program product for behavioral characteristics based user verification. An embodiment includes a method for user verification. The embodiment presents, to a user, from an application using a processor and a memory, a set of questions, wherein the user has not previously been asked the set of questions. The embodiment analyzes a set of answers received from the user, the set of answers corresponding to the set of questions. The embodiment computes, using the processor and the memory, a score using the set of answers. The embodiment determines whether the score matches, within a tolerance value, a base score in a psychological profile of the user. The embodiment concludes, responsive to the score matching the base score within the tolerance value, that an identity of the user has been verified.

Another embodiment includes a computer readable article of manufacture tangibly embodying a computer readable instructions which, when executed, cause a computer to carry out steps of a method for user verification.

Another embodiment includes a data processing system for user verification. The embodiment further includes a storage device, wherein the storage device stores computer usable program code. The embodiment further includes a processor, wherein the processor executes the computer usable program code. The embodiment further includes computer usable code for presenting, to a user, from an application using a processor and a memory, a set of questions, wherein the user has not previously been asked the set of questions. The embodiment further includes computer usable code for analyzing a set of answers received from the user, the set of answers corresponding to the set of questions. The embodiment further includes computer usable code for computing, using the processor and the memory, a score using the set of answers. The embodiment further includes computer usable code for determining whether the score matches, within a tolerance value, a base score in a psychological profile of the user. The embodiment further includes computer usable code for concluding, responsive to the score matching the base score within the tolerance value, that an identity of the user has been verified.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings.

DETAILED DESCRIPTION

The illustrative embodiments recognize that the presently available methods for primary verification, additional verification, and secondary verification, (collectively hereinafter, "user verification" or "user verification method"), all require the user to remember certain pieces of information. Often, the pieces of information that the user is expected to remember, such as user IDs, passwords, or identifiers, are cryptic, complex or lengthy strings, unusual words or spellings, and the like.

Even otherwise, the presently available user verification methods require the user to be in possession of a device. For example, some user verification methods use an identifier associated with a device in the user's possession as a method of verifying the user's identity. A mobile device is such an example device, which has associated therewith an International Mobile Equipment Identity (IMEI) number. The IMEI number of a mobile device can be read, sensed, or detected from the mobile device when the mobile device is accessible to a user verification process for reading, sensing, or detection.

Keycards are another example of devices used for user verification. A keycard presents a number, which changes sporadically. The identity of the user, to whom the keycard is assigned, is verified if the user has the keycard available to the user and can provide the number presented on the keycard at the time of the user verification.

In the simplest form, a government issued identity card is another device with a similar use. A user is expected to present the identity card, which the user is expected to have in the user's possession, to verify the user's identity.

The illustrative embodiments recognize that reliance on a user's memory or possession for verifying a user's identity is a fundamentally flawed concept. These flaws are apparent from the thousands if not millions of cases of identity theft that occur every year, whereby specific pieces of information such as user IDs, passwords, and identifiers, or devices, such as mobile phones, keycards, and driver licenses, are stolen and presented to masquerade a malicious user as the genuine user associated with those devices or information.

The illustrative embodiments used to describe the invention generally address and solve the above-described problems and other problems related to user verification. The illustrative embodiments provide a method, system, and computer program product for behavioral characteristics based user verification.

Certain aspects of a user's behavior are well known to stay consistent over long periods of time, such as for several years, and sometimes over the user's lifetime. For example, if the user has certain likes and dislikes, those likes or dislikes remain stable and unchanging over significant periods of time.

For example, assume that a user is asked whether the user prefers sports, theater, or reading as a favorite pastime. If the user indicates that the user's favorite pastime is sports, the user is very likely to select sporting options from a random set of choices presented to the user, even if the user has never seen those choices before.

As another example, assume that a user is asked whether the user prefers sports cars, antique cars, or luxury cars. If the user indicates that the user's prefers luxury cars, the user is very likely to select a luxury vehicle from a random set of vehicular choices presented to the user, even if the user has never seen those vehicular choices before or has never selected the particular luxury vehicle depicted in those choices before.

A behavioral characteristic is a characteristic of trait of a person that is ingrained in, or which derives from, a personality or human nature specific to that person. A choice, selection, preference, inclination, gravitation, liking, or other manner of associating oneself with a category of things, notions, actions, or generally any subject, is an example of a behavioral characteristic.

The illustrative embodiments recognize that people exhibit behavioral characteristics in many other overt and covert ways. For example, a person's choice of a favorite pastime, or a type of vehicle the person favors are some simplistic examples of a person's overt behavioral characteristic. Whether a person is a leader or a follower, or whether a person is an extrovert or an introvert, are some examples of a person's covert behavioral characteristic.

The illustrative embodiments further recognize that behavioral characteristics of a person are related to the person's psychology. For example, the extrovert or introvert nature of the person is a psychological characteristic of a person that originates from the person's ingrained psychology. Some other examples of a psychological characteristic include, but are not limited to, choices a person is likely to make or not make, a course of action a person is likely or unlikely to undertake, a response a person is likely to give or not give under a given circumstance, an amount of time the person can be expected to take to solve a problem, an interpretation a person is expected to adopt of something, and a manner in which a person is expected to rationalize or analyze a situation.

The illustrative embodiments recognize that a person's psychology also does not change significantly over a short span of time relative to the person's lifespan. Therefore, the illustrative embodiments recognize that the persons' psychological characteristics also remain relatively stable over significant lengths of time. Hereinafter, the terms behavioral characteristic and psychological characteristic are used interchangeably to mean a characteristic of a person originating from a person's psychology, which under certain circumstances can be expected in the person's behavior.

An embodiment uses a person's behavioral characteristics to establish the user's identity. An embodiment is implemented as an application to execute in a data processing system that verifies a user's identity, whether in the form of primary verification, or additional verification, or secondary verification.

An embodiment creates a psychological profile of a user before the user's identity can be verified using another embodiment. The embodiment is usable to create the psychological profile at the time when a user account or profile is initially configured. The embodiment is also usable to create and add the psychological profile to an existing user account or profile. The embodiment is further usable to update, enhance, or change, a previously created psychological profile associated with the user.

One embodiment presents the user a set of categories of things, notions, actions, and so on. The embodiment asks the user about the user's preferred categories from the set. The preferred subset of categories indicates the user's behavioral characteristics to the embodiment.

The embodiment analyzes and scores the user's selected subset of categories. For example, if the user prefers the luxury car category amongst the sports cars, antique cars, and luxury cars categories, the analysis concludes that the user has indicated a discrete choice, and a score corresponding to that choice can be the term "luxury" or a synonym thereof, as relates to vehicles.

As another example, from the sports cars, antique cars, and luxury cars categories, suppose the user prefers the luxury car category eighty percent of times, sports cars twenty percent of times. The analysis concludes that the user has indicated a divided choice. Accordingly, a score corresponding to that choice can be the term "luxury" or a synonym thereof as relates to vehicles, can apply to no more than eighty percent of specific vehicle choices the user selects when those specific vehicle choices are presented later to the user for user verification. Furthermore, the same score or a second score corresponding to that choice can be the term "sport" or a synonym thereof as relates to vehicles, can apply to no more than twenty percent of specific vehicle choices the user selects when those specific vehicle choices are presented later to the user for user verification.

Likewise, from the reds, yellows, and greens color categories, suppose the user prefers the reds category. The analysis concludes that the user has indicated a preference for red hues. Accordingly, a score corresponding to that choice can be the color red should occupy a majority of an image, e.g. fifty percent or more of the image's color palette, in a specific image choice that the user selects when specific image choices are presented later to the user for user verification.

Another embodiment selects one or more psychological characteristics that should be evaluated in the user. For example, the embodiment determines that the user's introvert or extrovert nature should be evaluated. Accordingly, the embodiment presents the user a set of questions designed to elicit answers that would be indicative of the user's introvert or extrovert psychology.

For example, an example set of questions may present a variety of social situations to the user and give multiple choice answers from which the user has to choose the answer most applicable to him in those situations. An analysis of the answers selected by the user characterizes the user having a certain degree of introvert psychology, a certain degree of extrovert psychology, or a combination thereof. One or more scores corresponding to the analysis are the various degrees of the introvert or extrovert nature of the user. During user verification using an embodiment, the answers that the user provides in response to the questions about new social situations, which were previously not presented to the user, should conform to or match with these one or more scores within a tolerance value.

Additional embodiments operate to perform user verification using the psychological profile associated with the user. For example, one embodiment identifies a category and a related score from the psychological profile. The embodiment extracts a set of questions from a repository to construct a questionnaire for user verification. For example, some questions in the questionnaire belong to the category and other questions do not.

If the user is the correct user, the embodiment expects that the user's answers will behaviorally gravitate to the selected category, such as by having more number of favorable answers to the questions in the selected category than in other categories. The embodiment analyzes the set of answers and scores the user's answers.

For example, continuing with the above example of categories of cars, the embodiment determines whether the user selected luxury cars choices over antique car choices when specific vehicles of only those types were offered as multiple choice answers. Alternatively, the embodiment determines whether the user selected luxury vehicles in between seventy and ninety percent of the answers and sports vehicle in between thirty and ten percent of the answers when specific vehicles of both types were available in the multiple choice answers.

As another example, another embodiment identifies a psychological characteristic and a related score from the psychological profile. The embodiment extracts a set of questions from a repository to construct a questionnaire for user verification. For example, the questions in the questionnaire are not previously seen by the user, and are designed to establish a presence, an absence, or a degree of presence or absence of the same psychological characteristic.

If the user is the correct user, the embodiment expects that the user's answers will psychologically answer the questions in a manner that conforms to the score of the psychological characteristic in the user's profile. The embodiment analyzes the set of answers and scores the user's answers.

For example, continuing with the above example of introvert or extrovert behavior, suppose the score in the user's profile indicates that the user almost always, e.g., ninety percent of the times, exhibits introvert characteristics. Accordingly, the embodiment determines whether the user selected at least eighty five to ninety five percent of the answers that indicate introvert characteristics.

If a user verification embodiment determines that the user's answers to previously unseen behavioral or psychological questions match the scores for the corresponding behavioral characteristics or psychological characteristics in the user's profile within a threshold value, the embodiment concludes that the user is who the user asserts he or she is. Otherwise, if the user verification embodiment determines that the user's answers to previously unseen behavioral or psychological questions do not match the scores for the corresponding behavioral characteristics or psychological characteristics in the user's profile within a threshold value, the embodiment concludes that the user is not who the user asserts he or she is.

Any subsequent action can be performed following a successful or failed verification. For example, a prior-art method of verification can be applied after a user fails the verification performed by an embodiment, or a prior-art method of verification can be applied before or after a user passes the verification performed by an embodiment.

The particular behavioral characteristics or psychological characteristics, the particular categories or questions, the particular analyses or scores, described above are only examples that are used to clarify certain aspects of certain embodiments. These examples are not intended to be limiting on the illustrative embodiments. From this disclosure, those of ordinary skill in the art will be able to conceive many other examples for comparable purposes, and the same are contemplated within the scope of the illustrative embodiments.

A method of an embodiment described herein, when implemented to execute on a device or data processing system, comprises substantial advancement of the functionality of that device or data processing system in user verification. For example, in order to verify a user's identity, the prior-art requires the user to be in possession of a previously established exact information or device. In contrast, an embodiment incorporates the user's behavioral and psychological traits into the user verification process. Operating in a manner described herein, an embodiment uses information not previously seen or provided by the user to evaluate a behavioral characteristic or psychological characteristic of the user. If the user exhibits the same behavioral characteristic or psychological characteristic based on previously unanswered questions and previously unseen or unprovoked information, at a comparable level as recorded in the user's profile, the user can be verified without the user being in possession of any previously established exact information or device. Such manner of user verification is unavailable in presently available devices or data processing systems. Thus, a substantial advancement of such devices or data processing systems by executing a method of an embodiment improves the user experience, the accuracy, the reliability, the security, and the portability of the user verification processes.

The illustrative embodiments are described with respect to certain characteristics, analyses, scores, values, tolerances, questions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
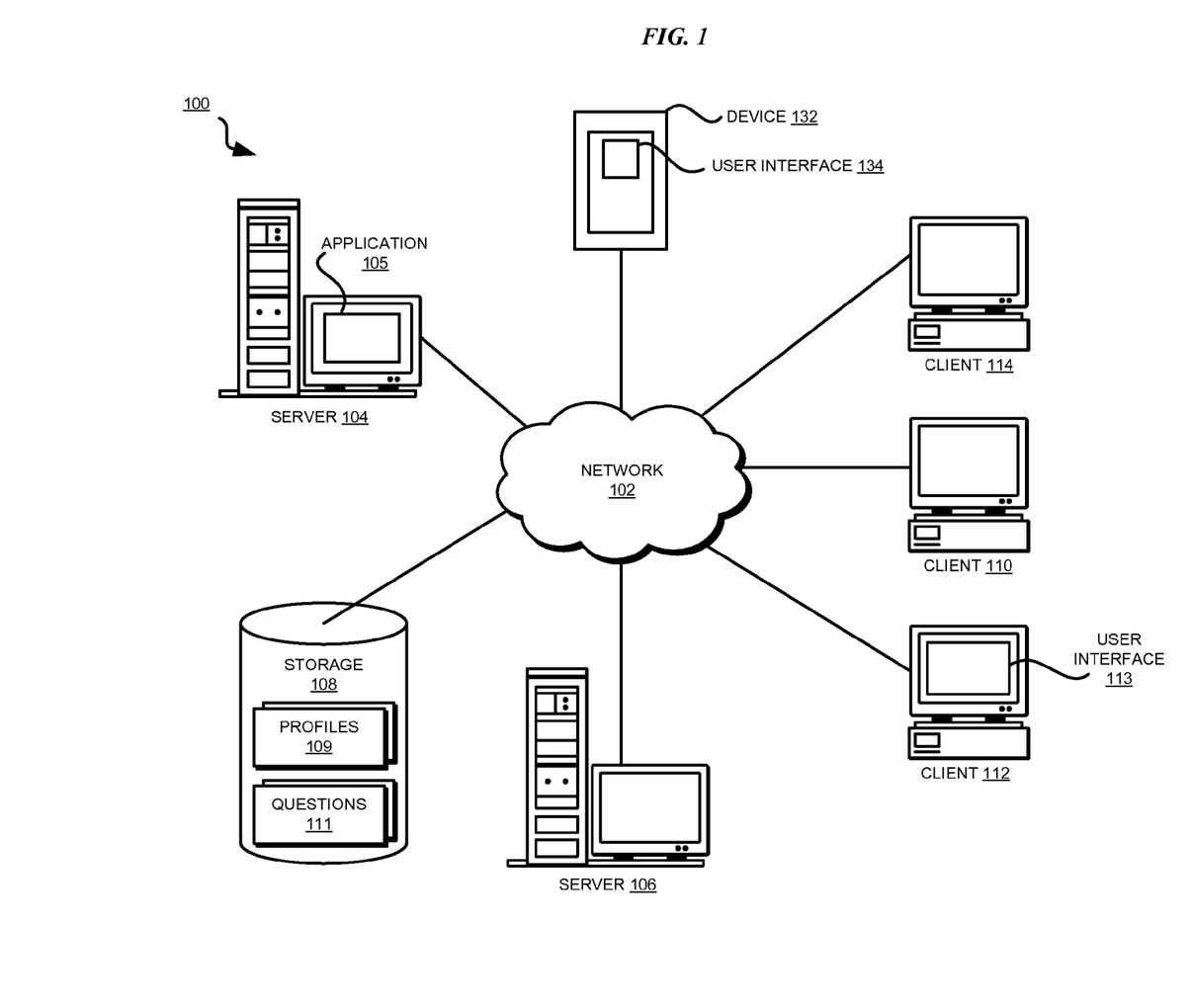
FIG. 1 depicts a block diagram of a network of data processing systems in which illustrative embodiments may be implemented.
Figure 2:
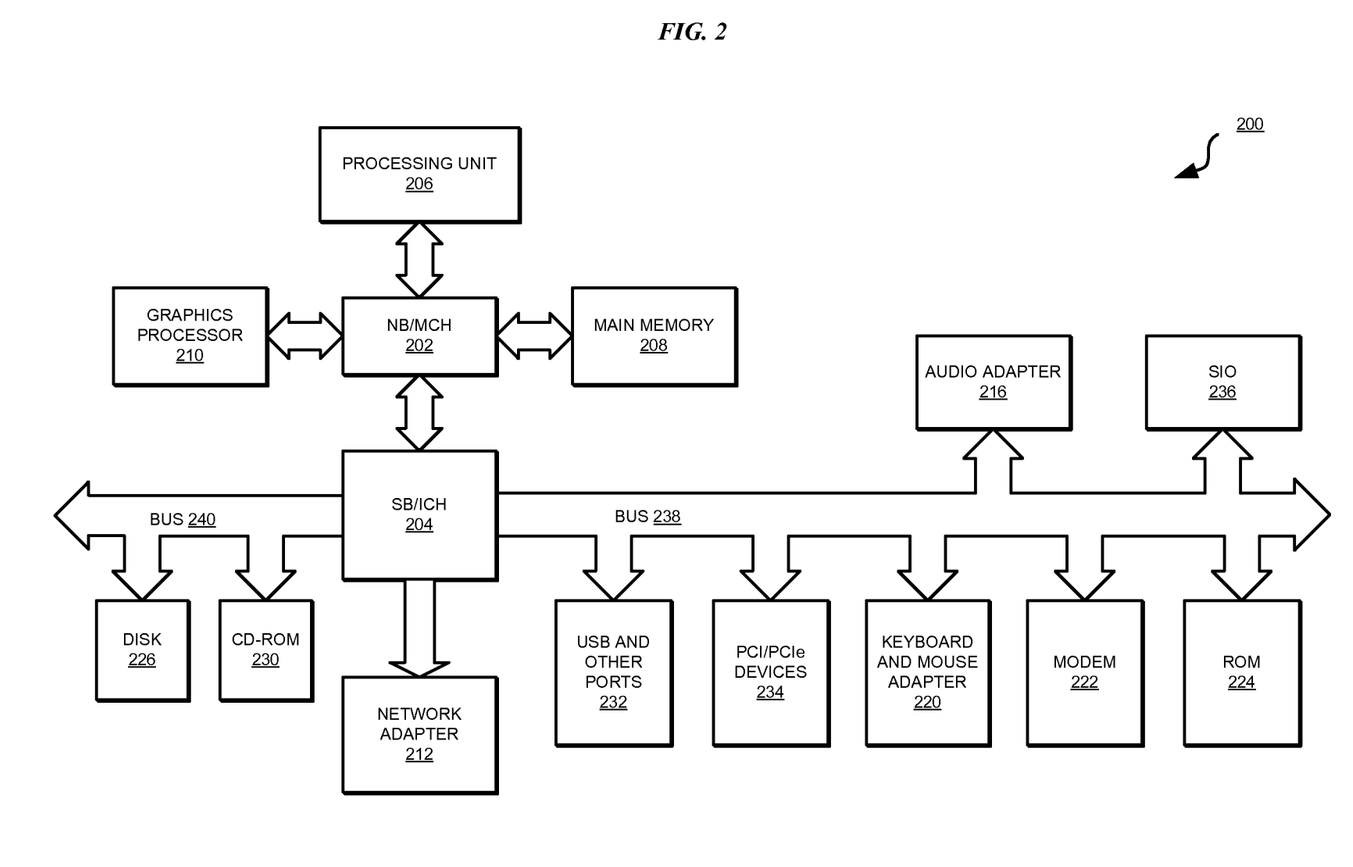
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for requesting entity reviews and analysis reports. User interface (UI) 134 is an example client-side interface using which an embodiment can accept inputs from a user to configure a psychological profile in the user's profile, can present questionnaires, and accept the user's answer inputs to perform user verification. Application 105 in server 104 implements one or more embodiments described herein, such as to interact with UI 134 to create or manage the psychological profile, select and present one or more questionnaires, and analyze and score the user's answer inputs to verify the user. UI 113 on client 112 operates in a manner similar to UI 134 in device 132, and interacts with application 105 to perform similar functions. Profiles 109 is a set of user profiles associated with a corresponding set of users. All or a subset of profiles 109 include a psychological profile usable in conjunction with an embodiment as described herein. Questions 111 form a repository of questions from which application 105 can construct one or more questionnaires as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
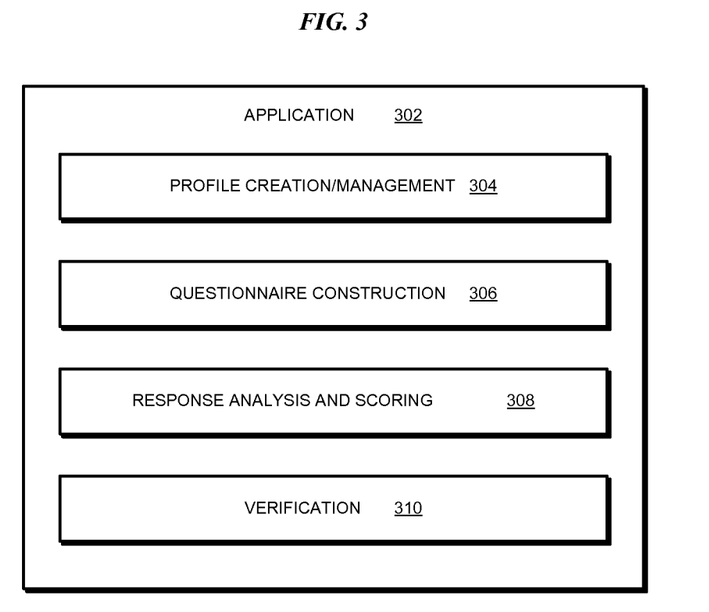
FIG. 3 depicts a block diagram of an example configuration for behavioral characteristics based user verification in accordance with an illustrative embodiment.

With reference to FIG. 3, this figure depicts a block diagram of an example configuration for behavioral characteristics based user verification in accordance with an illustrative embodiment. Application 302 can be implemented as application 105 in FIG. 1.

Component 304 of application 302 creates, updates, and otherwise manages the psychological profile associated with a user's account or with a different profile of the user. Not only can component 304 create new psychological profiles, component 304 also operates to update an old psychological profile.

For example, if a user's psychological profile has existed in a data processing system for greater than a threshold period of time, it may be desirable to review and revise the psychological profile to ensure that the psychological profile continues to match the user's behavioral characteristics or psychological characteristics. As another example, when additional or different categories, additional or different questions, additional or different behavioral characteristics or psychological characteristics, or additional or different methods to evaluate a behavioral characteristic or psychological characteristic become available, component 304 operates to review or revise an existing psychological profile of a user.

Component 306 constructs one or more questionnaires. For example, component 306 constructs one or more questionnaires to facilitate component 304's creation or management of a psychological profile. As another example, component 306 constructs one or more questionnaires to facilitate component 310's verification of a user's identity.

Component 308 analyzes and scores user responses to questions in a questionnaire. For example, in a manner described elsewhere in this disclosure, component 308 analyzes and scores answers to one or more questionnaires to facilitate component 304's creation or management of a psychological profile. As another example, component 308 analyzes and scores answers to one or more questionnaires to facilitate component 310's verification of a user's identity.

Component 310 performs user verification using one or more questionnaires prepared by component 306. Component 310 uses the analysis and scoring functions of component 308 to determine whether the answers provided by the user sufficiently match the one or more behavioral characteristics or psychological characteristics configured in the psychological profile of the user.

Figure 4:
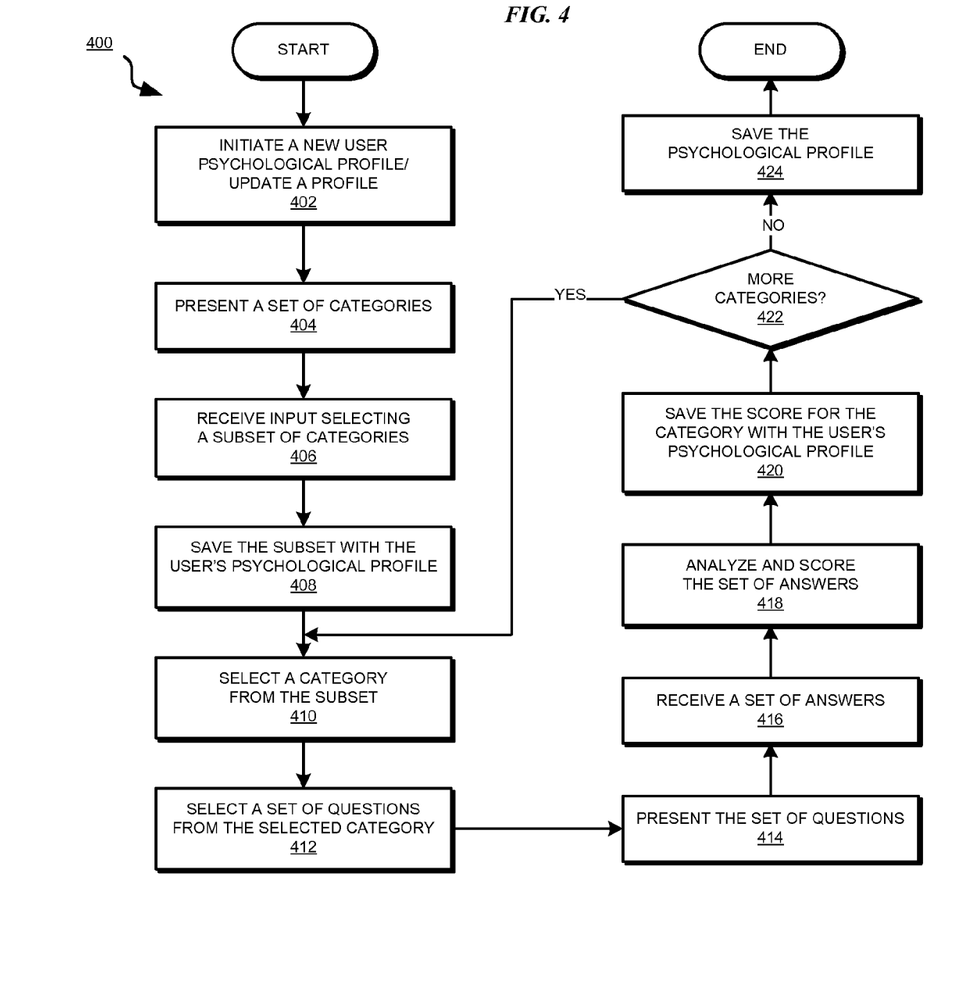
FIG. 4 depicts a flow chart of an example process for managing a psychological profile for behavioral characteristics based user verification in accordance with an illustrative embodiment.

With reference to FIG. 4, this figure depicts a flow chart of an example process for managing a psychological profile for behavioral characteristics based user verification in accordance with an illustrative embodiment. Process 400 can be implemented in application 302 in FIG. 3.

The application initiates the creation, updating, or management of a user profile (block 402). The application presents a set of categories to the user (block 404).

The application receives an input from the user, where the input selects a subset of the categories (block 406). The application saves the selected subset of categories with the user's profile or account, such as in a psychological profile associated therewith (block 408).

The application selects a category from the selected subset of categories (block 410). The application selects a set of questions from the selected category (block 412). The application presents the set of questions to the user (block 414).

The application receives a set of answers corresponding to the set of questions (block 416). The application analyzes and scores the set of answers (block 418). The application saves the score for the category in the user's psychological profile (block 420).

The application determines if more categories in the selected subset of categories are to be processed in this manner (block 422). If so ("Yes" path of block 420), the application returns process 400 to block 410 to select another category from the subset. If not ("No" path of block 422), the application saves the user's psychological profile (block 424). The application ends process 400 thereafter.

Note that process 400 is described as processing one category at a time only to avoid complicating the depiction and the description. From this disclosure, those of ordinary skill in the art will be able to adapt process 400 to simultaneously select multiple categories from the subset, ask questions relates to those multiple categories, and analyze and score answers pertaining to those questions in those multiple categories. Such adaptations are contemplated within the scope of the illustrative embodiments.

Figure 5:
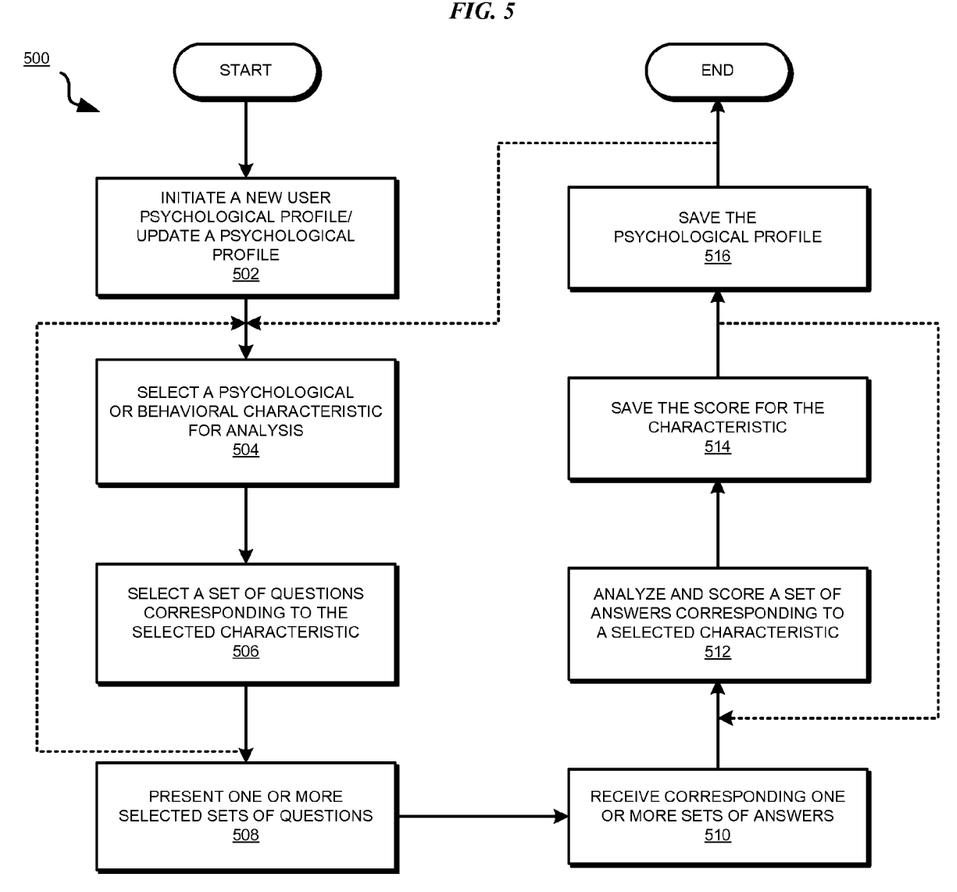
FIG. 5 depicts a flow chart of another example process for managing a psychological profile for behavioral characteristics based user verification in accordance with an illustrative embodiment.

With reference to FIG. 5, this figure depicts a flow chart of another example process for managing a psychological profile for behavioral characteristics based user verification in accordance with an illustrative embodiment. Process 500 can be implemented in application 302 in FIG. 3.

The application initiates the creating, updating, or managing of a user profile (block 502). The application selects a behavioral characteristic or psychological characteristic for analysis (block 504).

The application selects a set of questions corresponding to the selected characteristic (block 506). The application can repeat blocks 504 and 506 any number of times to select any number of characteristics and their corresponding sets of questions. The application presents one or more selected sets of questions to the user (block 508).

The application receives one or more sets of answers corresponding to the one or more set of questions (block 510). The application analyzes and scores a set of answers corresponding to a selected characteristic (block 512). The application saves the score for the characteristic in the user's psychological profile (block 514). The application can repeat blocks 512 and 514 any number of times to analyze and score any number of sets of answers and their corresponding characteristics.

If only one characteristic was selected at block 504, the application can optionally return process 500 to block 504 to select another characteristic for processing in a similar manner. When no more characteristics are to be processed, the application saves the user's psychological profile (block 516). The application ends process 500 thereafter.

Note that process 400 and process 500 are described as separate processes only to avoid complicating the depiction and the description. From this disclosure, those of ordinary skill in the art will be able to adapt and combine processes 400 and 500 to simultaneously select a combination of categories and behavioral characteristics or psychological characteristics, ask questions relates to that combination, and analyze and score answers pertaining to those questions for that combination. Such adaptations are contemplated within the scope of the illustrative embodiments.

Figure 6:
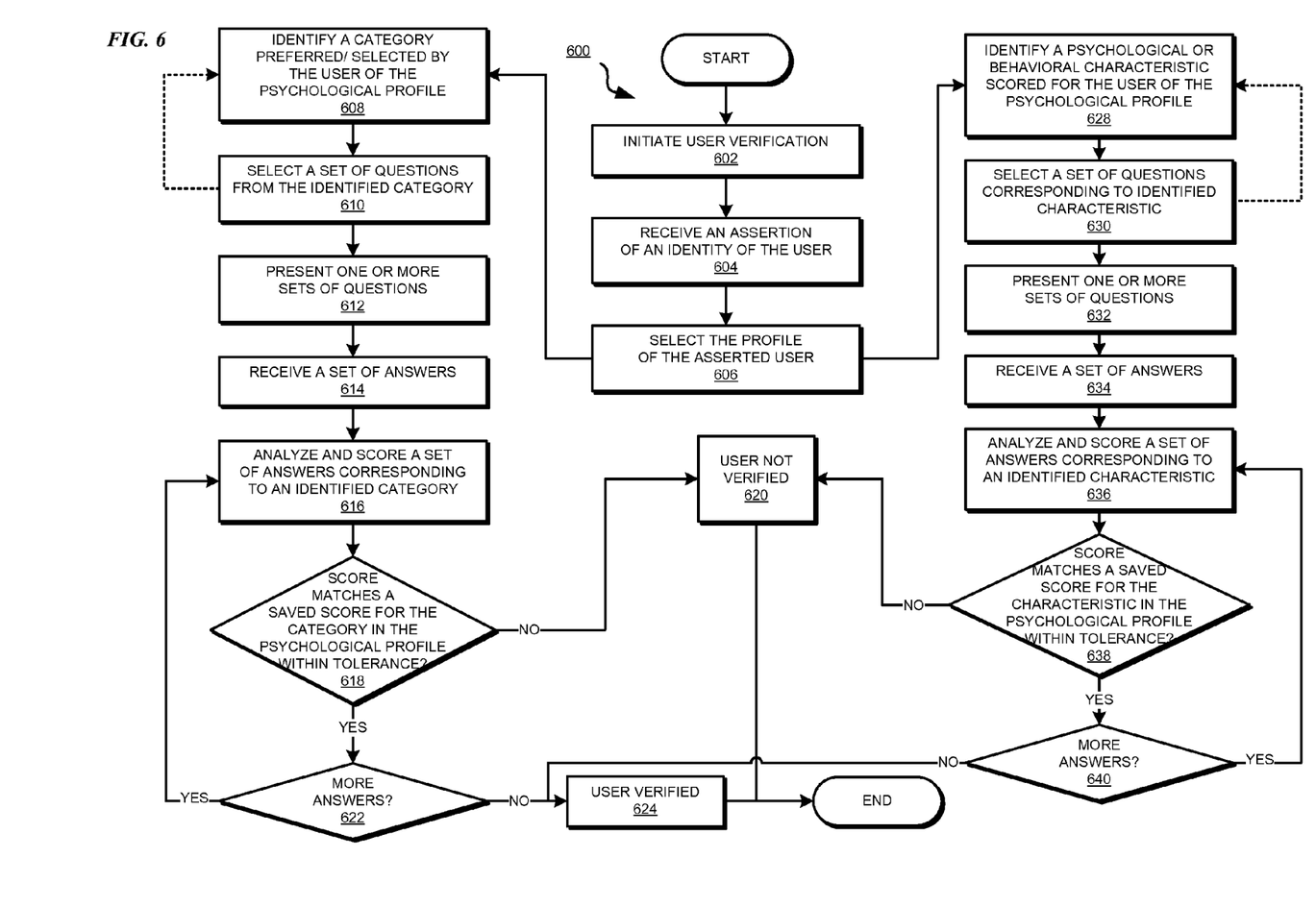
FIG. 6 depicts a flow chart of an example process for behavioral characteristics based user verification in accordance with an illustrative embodiment.

With reference to FIG. 6, this figure depicts a flow chart of an example process for behavioral characteristics based user verification in accordance with an illustrative embodiment. Process 600 can be implemented in application 302 in FIG. 3.

The application initiates a user verification process for a user (block 602). The application receives an assertion of an identity of the user (block 604). For example, the user may provide a name of the user or another piece of information to assert that the user is who the user claims he or she is. This assertion is to be verified in process 600.

The application selects a profile of the asserted user (block 606). Following block 606, one or both branches originating from block 606 can be traversed by the application.

According to one branch, the application identifies a category preferred or selected by the user in the user's psychological profile (block 608). The application selects a set of questions from the identified category (block 610). The application presents the set of questions to the user (block 612).

The application receives a set of answers corresponding to the set of questions (block 614). The application analyzes and scores the set of answers (block 616).

The application determines whether the computed score from block 616 matches, within a tolerance value, a saved score for the category in the user's psychological profile (block 618).

If a match does not exist ("No" path of block 618), the application concludes that the user cannot be verified (block 620). The application may end process 600 thereafter, or proceed (not shown) to the other branch from block 606, or wait (not shown) for a parallel execution of the other branch to complete. For example, a match failure in one category may not be conclusive evidence of a failed user verification. In such cases, the activities in the other branch, or continued processing (not shown), or other categories in the same branch can be configured into process 600 within the scope of the illustrative embodiments.

If a match exists ("Yes" path of block 618), the application determines if more answers are to be processed in this manner (block 622). If more answers are to be processed in this manner ("Yes" path of block 622), the application returns process 600 to block 616 to select another set of answers. If no more answers are to be processed in this manner ("No" path of block 622), the application concludes that the user has been verified (block 624).

The application may end process 600 thereafter, or proceed (not shown) to the other branch from block 606, or wait (not shown) for a parallel execution of the other branch to complete. For example, a match success in the present branch may not be conclusive evidence of a successful user verification. In such cases, within the scope of the illustrative embodiments, a final conclusion of success or failure of the user verification may be deferred until the activities in the other branch are completed.

According to another branch, the application identifies a behavioral characteristic or a psychological characteristic previously scored for the user in the user's psychological profile (block 628). The application selects a set of questions corresponding to the identified characteristic (block 630). The application presents the set of questions to the user (block 632).

The application receives a set of answers corresponding to the set of questions (block 634). The application analyzes and scores the set of answers corresponding to a identified characteristic (block 636).

The application determines whether the computed score from block 636 matches, within a tolerance value, a saved score for the characteristic in the user's psychological profile (block 638).

If a match does not exist ("No" path of block 638), the application concludes that the user cannot be verified (block 620). The application may end process 600 thereafter, or proceed (not shown) to the other branch from block 606, or wait (not shown) for a parallel execution of the other branch to complete. For example, a match failure in one category may not be conclusive evidence of a failed user verification. In such cases, the activities in the other branch, or continued processing (not shown), or other categories in the same branch can be configured into process 600 within the scope of the illustrative embodiments.

If a match exists ("Yes" path of block 638), the application determines if more answers are to be processed in this manner (block 640). If more answers are to be processed in this manner ("Yes" path of block 640), the application returns process 600 to block 636 to select another set of answers. If no more answers are to be processed in this manner ("No" path of block 640), the application concludes that the user has been verified (block 624).

The application may end process 600 thereafter, or proceed (not shown) to the other branch from block 606, or wait (not shown) for a parallel execution of the other branch to complete. For example, a match success in the present branch may not be conclusive evidence of a successful user verification. In such cases, within the scope of the illustrative embodiments, a final conclusion of success or failure of the user verification may be deferred until the activities in the other branch are completed.

Thus, a computer implemented method, system or apparatus, and computer program product are provided in the illustrative embodiments for behavioral characteristics based user verification. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for user verification, the method comprising:
receiving, from a user, a selection of a category from a subset of a set of categories;
presenting, to the user, a base set of questions, wherein the base set of questions presents a plurality of social situations to the user and provides a plurality of answers to each question to allow the user to choose an answer most applicable to the user in a particular social situation of the plurality of social situations, and wherein the base set of questions is related to the category selected by the user;
analyzing a base set of answers received from the user, the base set of answers corresponding to the base set of questions;
computing, using a processor and a memory, a base score using the base set of answers, the base score being indicative of a behavioral characteristic related to an ingrained psychological nature of the user in social situations, wherein the behavioral characteristic is indicative of the user being either an introvert or an extrovert in social situations;
saving the base score in a psychological profile associated with the user;
presenting, to the user, a set of questions, wherein the user has not previously been asked the set of questions, wherein the set of questions is also related to the category, and wherein questions in the base set of questions are distinct from questions in the set of questions;
analyzing a set of answers received from the user, the set of answers corresponding to the set of questions, wherein the answers in the set of answers are distinct from answers in the base set of answers;
computing, using the processor and the memory, a score using the set of answers;
determining whether the score matches, within a tolerance value, the base score in the psychological profile of the user, the behavioral characteristic causing the user to respond to the set of questions such that the score matches the base score within the tolerance value; and
concluding one of
  (i) responsive to the score matching the base score within the tolerance value, that an identity of the user has been verified, and
  (ii) responsive to the score not matching the base score within the tolerance value, matching with a different base score a different score that is computed using a different set of answers corresponding to a different set of questions, and concluding that the identity of the user is not verified responsive to the different score not matching the different base score within a different tolerance value.

2. The method of claim 1, further comprising:
selecting, the behavioral characteristic from a set of behavioral characteristics; and
selecting the base set of questions from a questions repository, wherein the questions repository includes questions to evaluate each behavioral characteristic in the set of behavioral characteristics, wherein in selecting a second set of answers from the user corresponding to a second base set of questions is usable to evaluate a second behavioral characteristic of the user.

3. The method of claim 1, further comprising:
receiving the set of answers from the user, responsive to the presenting the set of questions; and
determining, as a part of the analyzing, a preference of the user for the category, the score quantifying the preference.

4. The method of claim 1, wherein the set of questions is related to a category of subjects preferred by the user, and wherein the different set of questions is designed to evaluate a different behavioral characteristic of the user.

5. The method of claim 1, further comprising:
presenting, to the user, the set of questions and the different set of questions simultaneously.

6. The method of claim 1, further comprising:
presenting, to the user, the different set of questions after the set of answers has been received from the user.

7. The method of claim 1, wherein an answer in the set of answers has not previously been provided by the user.

8. A computer usable program product comprising a computer readable medium tangibly embodying a computer readable instructions which, when executed, cause a computer to carry out steps of a method for user verification, the method comprising:
receiving, from a user, a selection of a category from a subset of a set of categories;
presenting, to the user, a base set of questions, wherein the base set of questions presents a plurality of social situations to the user and provides a plurality of answers to each question to allow the user to choose an answer most applicable to the user in a particular social situation of the plurality of social situations, and wherein the base set of questions is related to the category selected by the user;
analyzing a base set of answers received from the user, the base set of answers corresponding to a base set of questions;
computing, using a processor and a memory, a base score using the base set of answers, the base score being indicative of a behavioral characteristic related to an ingrained psychological nature of the user in social situations, wherein the behavioral characteristic is indicative of the user being either an introvert or an extrovert in social situations;
saving the base score in a psychological profile associated with the user;
presenting, to the user, a set of questions, wherein the user has not previously been asked the set of questions, wherein the set of questions is also related to the category, and wherein questions in the base set of questions are distinct from questions in the set of questions;
analyzing a set of answers received from the user, the set of answers corresponding to the set of questions, wherein the answers in the set of answers are distinct from answers in the base set of answers;
computing, using the processor and the memory, a score using the set of answers;
determining whether the score matches, within a tolerance value, the base score in the psychological profile of the user, the behavioral characteristic causing the user to respond to the set of questions such that the score matches the base score within the tolerance value; and
concluding one of
  (i) responsive to the score matching the base score within the tolerance value, that an identity of the user has been verified, and
  (ii) responsive to the score not matching the base score within the tolerance value, matching with a different base score a different score that is computed using a different set of answers corresponding to a different set of questions, and concluding that the identity of the user is not verified responsive to the different score not matching the different base score within a different tolerance value.

9. The computer usable program product of claim 8 embodying instructions which, when executed, cause the computer to carry out the method further comprising:

selecting, the behavioral characteristic from a set of behavioral characteristics; and selecting the base set of questions from a questions repository, wherein the questions repository includes questions to evaluate each behavioral characteristic in the set of behavioral characteristics, wherein in selecting a second set of answers from the user corresponding to a second base set of questions is usable to evaluate a second behavioral characteristic of the user.

10. The computer usable program product of claim 8 embodying instructions which, when executed, cause the computer to carry out the method further comprising:

receiving the set of answers from the user, responsive to the presenting the set of questions; and determining, as a part of the analyzing, a preference of the user for the category, the score quantifying the preference.

11. The computer usable program product of claim 8 further embodying transferring instructions which, when executed, cause the computer to carry out the method further comprising:

transferring over a network from a remote data processing system, the computer readable instructions; and storing, responsive to the transferring, the computer readable instructions in a data processing system.

12. The computer usable program product of claim 8 further embodying downloading instructions which, when executed, cause the computer to carry out the method further comprising:

downloading, from a server data processing system where the computer usable instructions are stored, over a network to a remote data processing system, the computer readable instructions for use in a computer readable storage device associated with the remote data processing system.

13. A data processing system for user verification, the data processing system comprising:

a computer readable medium, wherein the computer readable medium stores computer usable program code; and a processor, wherein the processor executes the computer usable program code, and wherein the computer usable program code comprises:

computer usable code for receiving, from a user, a selection of a category from a subset of a set of categories;

computer usable code for presenting, to the user, a base set of questions, wherein the base set of questions presents a plurality of social situations to the user and provides a plurality of answers to each question to allow the user to choose an answer most applicable to the user in a particular social situation of the plurality of social situations, and wherein the base set of questions is related to the category selected by the user;

computer usable code for analyzing a base set of answers received from the user, the base set of answers corresponding to a base set of questions;

computer usable code for computing, using the processor and a memory, a base score using the base set of answers, the base score being indicative of a behavioral characteristic related to an ingrained psychological nature of the user in social situations, wherein the behavioral characteristic is indicative of the user being either an introvert or an extrovert in social situations;

computer usable code for saving the base score in a psychological profile associated with the user;

computer usable code for presenting, to the user, a set of questions, wherein the user has not previously been asked the set of questions, wherein the set of questions is also related to the category, and wherein questions in the base set of questions are distinct from questions in the set of questions;

computer usable code for analyzing a set of answers received from the user, the set of answers corresponding to the set of questions, wherein the answers in the set of answers are distinct from answers in the base set of answers;

computer usable code for computing, using the processor and the memory, a score using the set of answers;

computer usable code for determining whether the score matches, within a tolerance value, the base score in the psychological profile of the user, the behavioral characteristic causing the user to respond to the set of questions such that the score matches the base score within the tolerance value; and computer usable code for concluding one of (i) responsive to the score matching the base score within the tolerance value, that an identity of the user has been verified, and (ii) responsive to the score not matching the base score within the tolerance value, matching with a different base score a different score that is computed using a different set of answers corresponding to a different set of questions, and concluding that the identity of the user is not verified responsive to the different score not matching the different base score within a different tolerance value.

\* \* \* \* \*